Patented Sept. 4, 1928.

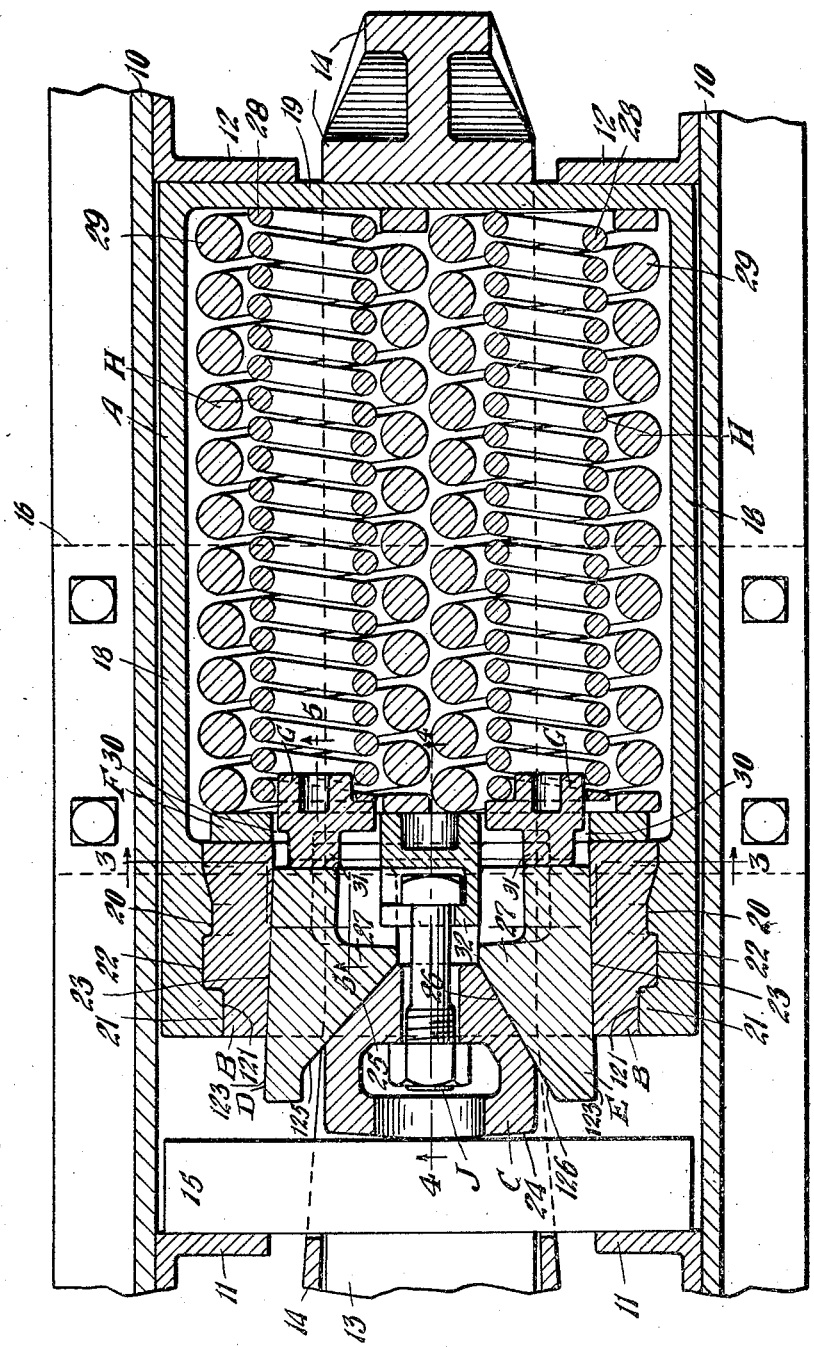

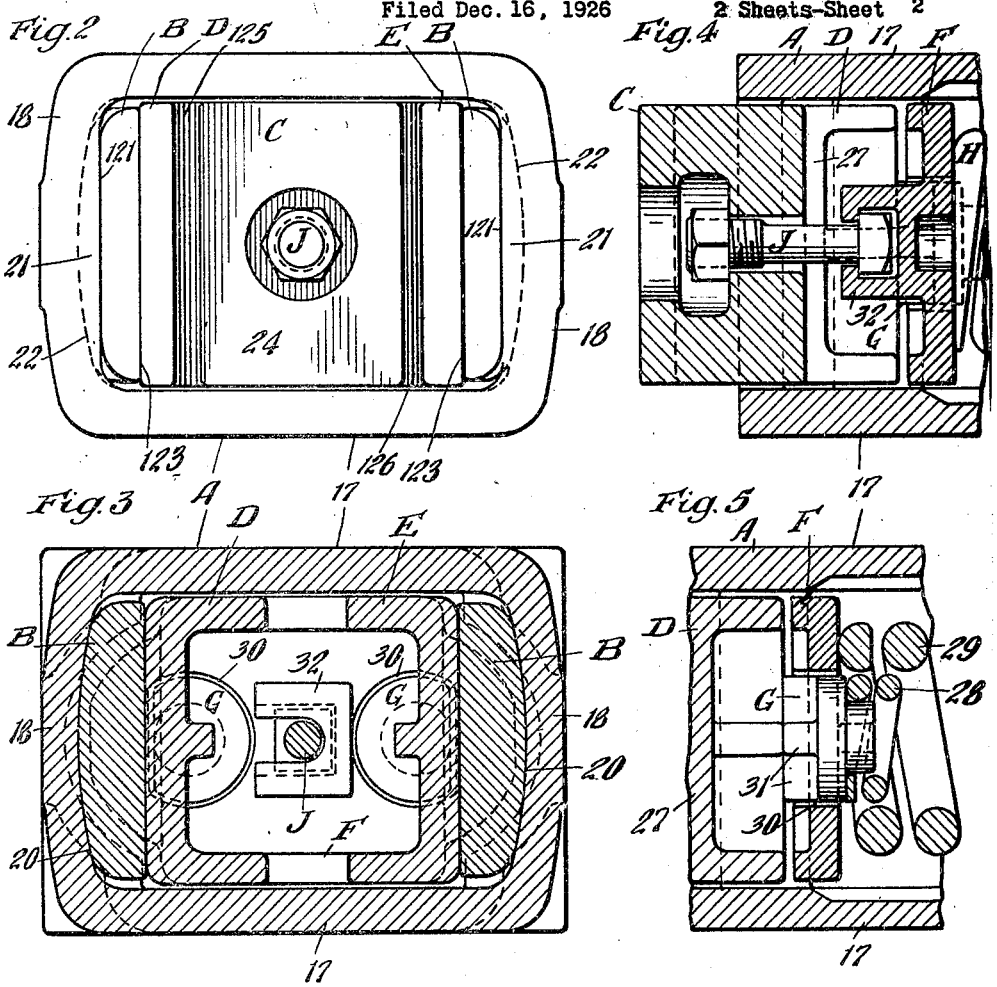

1,683,480

UNITED STATES PATENT OFFICE.

ROLAND J. OLANDER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 16, 1926. Serial No. 155,151.

This invention relates to improvements in friction shock absorbing mechanisms.

One object of the invention is to provide a friction shock absorbing mechanism especially adapted for railway draft riggings, including a column element having the friction system co-operating therewith, the friction system including friction shoes, and a spring means opposing relative movement of the friction system and column element, wherein the spring resistance means comprises a plurality of spring elements, certain of which oppose movement of the friction system during the entire compression stroke of the mechanism, and the remaining spring elements of which become effective after a predetermined compression of the mechanism to augment the resistance offered against movement of the friction shoes to produce high ultimate capacity.

A more specific object of the invention is to provide a friction shock absorbing mechanism including a spring cage open at one end and having removable liners at said open end to permit insertion of the spring resistance elements within the cage, together with friction means co-operating with the liners, wherein the springs are arranged in twin sets, each set comprising a relatively light inner spring opposing movement of the friction system during the entire compression stroke, and a relatively heavier outer spring effective after a predetermined compression of the mechanism to also oppose movement of the shoes, thereby greatly augmenting the resistance during the final action of the gear.

Other objects and advantages of the invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figure 2 is a front end elevational view of the shock absorbing mechanism proper. Figure 3 is a transverse vertical sectional view corresponding substantially to the line 3—3 of Figure 1. Figure 4 is a longitudinal, vertical, sectional view of the front end portion of the shock absorbing mechanism corresponding substantially to the line 4—4 of Figure 1. Figure 5 is a view similar to Figure 4 corresponding substantially to the line 5—5 of Figure 1.

In said drawings, 10—10 indicate channel-shaped center or draft sills of a railway car underframe, to the inner surfaces of which are secured the usual front stop lugs 11—11 and rear stop lugs 12—12. The inner end of the drawbar is designated by 13, to which is operatively connected a yoke 14 of well-known form. The shock absorbing mechanism proper, as well as a front main follower 15, is disposed within the yoke. The yoke and the parts contained therewithin are supported in operative position by a detachable saddle plate 16.

The improved shock absorbing mechanism proper, as shown, comprises broadly: A spring cage casting A provided with a pair of liners B—B; a wedge block C; two friction shoes D and E; a spring follower plate F; a pair of spring follower blocks G—G; twin arranged main spring resistance means H—H; and a retainer bolt J.

The casing or spring cage A is of generally rectangular box-like form having horizontally disposed top and bottom walls 17—17, vertically disposed longitudinally extending spaced side walls 18—18 and a transverse rear end wall 19, the latter co-operating with the stop lugs 12 in the manner of the usual rear follower. At the forward end, the side walls 18 of the cage are thickened as shown most clearly in Figure 1, the thickened portions being cut away as indicated at 20, thereby providing vertically disposed ribs 21—21 at the outer end of the cage. The cut away portions rearwardly of the ribs 21 present curved surfaces. Immediately in back of the rib 21 on each wall 18 the cut away portion 20 presents a groove 22.

The detachable liners B are two in number and are disposed at opposite sides of the mechanism. Each liner B has an outer surface corresponding in contour to the cut away portion 20 of the corresponding side wall of the spring cage and a flat faced section 121, adapted to co-operate with the flat outer face of the rib 21. The rib and groove connection between the liners B and the side walls of the cage serve as means for anchoring the liners against longitudinal movement with respect to the cage. On the inner side, each liner is provided with a longitudinally disposed flat friction surface 23, the surfaces 23 of the two liners being preferably converged inwardly of the mechanism.

The wedge member C is in the form of a block having a convex end face 24 adapted to bear directly on the inner surface of the main follower 15. At the inner end, the wedge member C is provided with a pair of wedge faces 25 and 26, the wedge face 26 being disposed at a relatively keen wedge acting angle with reference to the longitudinal axis of the mechanism and the wedge face 25 being disposed at a blunt angle with respect to said axis.

The friction shoes D and E are of similar design, except as hereinafter pointed out. Each shoe is formed with an outer flat friction surface 123 co-operating with the friction surface 23 of the lines at the same side of the mechanism. Each shoe is also provided with an enlargement 27 on the inner side whereof having a wedge face thereon, the wedge face of the shoe D being designated by 125 and the wedge face of the shoe E being designated by 126. The wedge faces 125 and 126 are correspondingly inclined to the wedge faces 25 and 26 of the wedge and co-operate respectively therewith.

The main spring resistance means H—H comprises twin arranged sets of springs, each set comprising a relatively light inner coil 28 and a heavier outer coil 29. The rear ends of both of the coils of each set bear directly on the transverse end wall 19 of the spring cage.

The spring follower F which is in the form of a heavy plate is interposed between the friction shoes and the coils 29 of the springs. The spring follower normally has the front face thereof spaced slightly from the inner ends of the friction shoes D and E to provide for a certain amount of preliminary action of the mechanism. Outward movement of the spring follower F is limited by engagement with the inner ends of the liners B which project laterally inwardly beyond the side walls of the spring cage. The spring follower F is provided with a pair of openings 30 adapted to loosely accommodate the spring follower blocks G.

The spring follower blocks G, which are two in number, are disposed at opposite sides of the mechanism and co-operate with the outer ends of the inner coils 28 of the spring resistance means. Each of the spring follower blocks G is provided with an extension 31 bearing directly on the inner end of the friction shoe at the corresponding side of the mechanism. Each of the spring follower blocks G is also provided with a cylindrical rearward extension seated within the corresponding spring coil 28 to prevent displacement of the spring follower block with reference to said spring.

The mechanism is held of overall uniform length by the retainer bolt J which has the head thereof anchored to an enlargement 32 on the spring follower F, the nut of the bolt being disposed within an opening in the wedge block and anchoring the outer end of the bolt to said block.

The retainer bolt in addition to holding the parts assembled, also maintains the springs 28 under initial compression, thereby compensating for wear of the various friction and wedge faces of the mechanism.

In assembling the mechanism, the spring resistance units are first inserted through the front end of the cage. The springs are then placed under compression with the spring follower F in position and the liners are then inserted. After the liners have been inserted, the spring follower blocks, friction shoes and wedge are assembled within the cage and the retainer bolt anchored in position and adjusted to proper overall length.

The operation of my improved shock absorbing mechanism, assuming a compression stroke, is as follows: The follower 15 and the cage A will be moved relatively toward each other, causing the wedge block C to be moved inwardly of the mechanism, forcing the friction shoes apart and placing the same into intimate contact with the friction surfaces of the shell liners. During this movement, the friction shoes are resisted only by the relatively light springs 28. During the continued inward movement of the wedge, the friction shoes will be carried inwardly of the shell until the inner ends of the same come into engagement with the spring follower F, whereupon the latter will be forced rearwardly in unison with the shoes, compressing the coils 29 of the springs in addition to the coils 28. It will be evident that due to both the springs 28 and 29 being compressed, during the latter part of the stroke of the mechanism, ultimate high capacity is obtained. The described action will continue until the actuating force is reduced or the follower 15 comes into engagement with the cage A, whereupon the pressure will be transmitted directly through the cage A to the stop lugs of the draft sills, the cage acting as a solid column load transmitting member to prevent the springs from being unduly compressed.

When the actuating force is reduced, the springe 28 and 29 will force the friction shoes outwardly, until movement of the spring follower is limited by engagement with the inner ends of the liners B, whereupon the coils 28 of the springs will force the friction shoes to the outermost position shown in Figure 1, movement of the shoes being limited by engagement with the wedge C which is anchored to the spring follower F.

It is pointed out that by employment of the blunt and keen wedge faces on the wedge block and friction shoes, a relatively high wedging action will be produced during compression of the mechanism, due to the keen wedge faces and release of the parts will be assured through the blunt wedge faces. In this connection, it will be understood by those skilled in the art that my improvements are capable of use in mechanism either employing the blunt and keen angle system of wedge faces or wedge faces which are all of the same angle with respect to the axis of the mechanism.

From the preceding description taken in connection with the drawings, it will be seen that I have provided a gear of exceptionally great column strength wherein the maximum spring space is provided and wherein the inner coils of the twin arranged springs are utilized to initially resist movement of the friction shoes of the wedge friction system, thereby eliminating the usual preliminary spring and spring follower employed in this type of gear.

While I have herein shown and described what I now consider the preferred form of carrying out my invention, the same is merely illustrative, and I contemplate all changes and modifications that come within the scope of the claims appended hereto.

I claim:

1. In a friction shock absorbing mechanism, the combination with a friction shell having longitudinally disposed friction surfaces; of friction shoes co-operating with said friction surfaces; a pressure transmitting element having wedging engagement with the shoes; and spring resistance means co-operating with the shoes, said spring resistance means including sets of members disposed at opposite sides of the mechanism, one of the members of each set opposing movement of the shoes during the entire compression stroke of the mechanism and maintaining said shoes in wedging engagement with the pressure transmitting element when the mechanism is released and the other member of each set opposing movement of the shoes after a predetermined compression of the mechanism.

2. In a friction shock absorbing mechanism, the combination with a spring cage open at one end only; of twin sets of spring resistance means within the cage occupying substantially the entire spring space thereof, each twin set comprising a pair of springs; liners anchored to the cage at the open end thereof, said liners being removable to permit insertion of the springs from the open end of the cage; friction shoes co-operating with the friction surfaces of the liners, movement of said shoes being directly resisted by one of the springs of each set during the entire compression stroke of the mechanism; spring follower means bearing directly on the other springs of said sets, said spring follower means being normally spaced from the shoes and adapted to be engaged and moved by said shoes after a predetermined compression of the mechanism to compress the springs co-operating with the spring follower; and wedge means co-operating with the shoes.

3. In a friction shock absorbing mechanism, the combination with a spring cage open at one end only, and having a friction shell section at said open end; of twin arranged sets of spring resistance means within the cage, each twin set comprising a pair of springs; friction shoes co-operating with the friction surfaces of the shell, movement of said shoes being directly resisted by one of the springs of each set during the entire compression stroke of the mechanism; spring follower means interposed between said last named springs and the friction shoes; additional spring follower means bearing directly on the remaining springs of said sets, said last named spring follower means being normally spaced from the shoes and adapted to be engaged and moved by said shoes after a predetermined compression of the mechanism to compress the springs co-operating with said last named spring follower; and wedge means co-operating with the shoes.

In witness that I claim the foregoing I have hereunto subscribed my name this 11th day of December 1926.

ROLAND J. OLANDER.